United States Patent
Estrada

(10) Patent No.: US 9,139,129 B2
(45) Date of Patent: Sep. 22, 2015

(54) VEHICLE WITH REAR LIGHT THAT IS DISPLACEABLE TO PRODUCE AT LEAST ONE AIRFLOW BREAKAWAY EDGE

(71) Applicant: Dr. Ing. h.c. F. Porsche Aktiengesellschaft, Stuttgart (DE)

(72) Inventor: Gustavo Estrada, Stuttgart (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 0 days.

(21) Appl. No.: 14/014,945

(22) Filed: Aug. 30, 2013

(65) Prior Publication Data
US 2014/0062127 A1 Mar. 6, 2014

(30) Foreign Application Priority Data

Aug. 30, 2012 (DE) .......................... 10 2012 108 049

(51) Int. Cl.
*B60Q 1/00* (2006.01)
*B62D 35/00* (2006.01)
*B60Q 1/26* (2006.01)

(52) U.S. Cl.
CPC ............ *B60Q 1/0017* (2013.01); *B60Q 1/0035* (2013.01); *B60Q 1/2692* (2013.01); *B62D 35/007* (2013.01)

(58) Field of Classification Search
CPC .. B62D 35/007; B62D 35/001; B60Q 1/0017; B60Q 1/0035; B60Q 1/2692
USPC .......................................... 296/180.5, 180.1
See application file for complete search history.

(56) References Cited

U.S. PATENT DOCUMENTS

| | | | |
|---|---|---|---|
| 5,054,844 A | 10/1991 | Miwa | |
| 5,119,068 A | 6/1992 | Nagai et al. | |
| 5,923,245 A | 7/1999 | Klatt et al. | |
| 7,578,542 B2 | 8/2009 | Schreiber | |
| 2011/0198885 A1 | 8/2011 | Ilse et al. | |

FOREIGN PATENT DOCUMENTS

| | | |
|---|---|---|
| DE | 39 49 916 | 6/1991 |
| DE | 100 62 076 | 6/2002 |
| DE | 10233041 | 2/2004 |
| DE | 102004035429 | 3/2006 |
| DE | 10 2008 003 476 | 7/2009 |
| DE | 10 2009 039 036 | 3/2011 |
| DE | 10 2011 003 339 | 8/2012 |
| DE | 10 2011 003 340 | 8/2012 |
| EP | 0 204 005 | 12/1986 |
| EP | 1 582 444 | 10/2005 |
| EP | 1 880 931 | 1/2008 |
| FR | 2896759 | 8/2007 |
| JP | 2002-120697 | 4/2002 |
| JP | 2004-210138 | 7/2004 |

OTHER PUBLICATIONS

German Search Report of Jun. 24, 2013.

*Primary Examiner* — Glenn Dayoan
*Assistant Examiner* — Melissa A Black
(74) *Attorney, Agent, or Firm* — Gerald E. Hespos; Michael J. Porco; Matthew T. Hespos

(57) ABSTRACT

A vehicle has rear lights (3) attached laterally to the rear of the vehicle (1). To improve the vehicle with regard to the aerodynamics, the two rear lights (3) can be moved in each case depending on requirements between a passive and an active position, in which at least one airflow breakaway edge is activated.

15 Claims, 1 Drawing Sheet

VEHICLE WITH REAR LIGHT THAT IS DISPLACEABLE TO PRODUCE AT LEAST ONE AIRFLOW BREAKAWAY EDGE

CROSS REFERENCE TO RELATED APPLICATION

This application claims priority under 35 USC 119 to German Patent Appl. No. 10 2012 108 049.6 filed on Aug. 30, 2012, the entire disclosure of which is incorporated herein by reference.

BACKGROUND

1. Field of the Invention

The invention relates to a vehicle having two rear lights attached laterally to the rear of the vehicle.

2. Description of the Related Art

DE 100 62 076 B4 discloses a vehicle having a trunk lid. An airflow breakaway edge is integrated on the rear edge of the trunk lid for the air stream. The airflow breakaway edge is attached in a recess and is flush with the surface of the surrounding trunk lid. However, the airflow breakaway edge can articulate rotatably on the trunk lid into an upwardly pivoted spoiler position. At least one light is integrated into the airflow breakaway edge.

It is an object of the invention to improve a vehicle having rear lights attached laterally to the rear of the vehicle, in particular with regard to the aerodynamics.

SUMMARY OF THE INVENTION

The invention relates to a vehicle having two rear lights attached laterally to the rear of the vehicle. The two rear lights can be moved depending on requirements between a passive position and an active position in which at least one airflow breakaway edge is activated. The airflow breakaway edge is not activated in the passive position of the rear lights. The movable design of the rear lights that are attached laterally to the rear of the vehicle enables the airflow breakaway edges to be produced particularly advantageously on the vehicle with airflow breakaway edges being arranged substantially vertically and not horizontally, as in the vehicle described in DE 100 62 076 B4. The vertical direction of a motor vehicle also is called the Z-direction. Analogously, the vehicle longitudinal direction is called the X-direction and the vehicle transverse direction is called the Y-direction.

The airflow breakaway edge preferably is arranged laterally on the outside of the rear lights or in the vicinity of the rear lights. As a result, substantially vertically running airflow breakaway edges on the vehicle can be produced in a simple way.

The rear lights preferably can be displaced in each case between the passive and the active position. The airflow breakaway edges are activated by displacement of the rear lights.

The rear lights preferably can be pivoted between the passive and the active position and the airflow breakaway edges are activated by pivoting the rear lights.

A pivot axis for the rear lights preferably is arranged laterally on the inside or laterally on the outside of the rear lights. Pivoting the rear lights can be brought about, for example, by electric motor.

A further airflow breakaway edge may be attached laterally on the inside of the rear lights. The further airflow breakaway edge can coincide with the pivot axis or rotating axis for the rear lights.

The airflow breakaway edges preferably are symmetrical in relation to a vehicle center axis. The airflow breakaway edges are particularly advantageously symmetrical with respect to a vehicle center axis which is arranged perpendicularly with respect to the vehicle longitudinal axis.

The airflow breakaway edges are assigned first rear light bodies that are attached to a body of the vehicle. The first rear light bodies preferably are attached to fenders or fender regions of the vehicle. Second rear light bodies are preferably attached to a tailgate of the vehicle, and a pair of first and second rear light bodies represents one rear light. The vehicle having the tailgate preferably is a hatchback vehicle.

The invention also relates to a rear light for an above-described vehicle and to an adjusting mechanism or an adjusting motor for adjusting a rear light of this type.

Further advantages, features and details of the invention result from the following description with reference to the drawings.

DETAILED DESCRIPTION OF THE PREFERRED EMBODIMENTS

Figure 1:
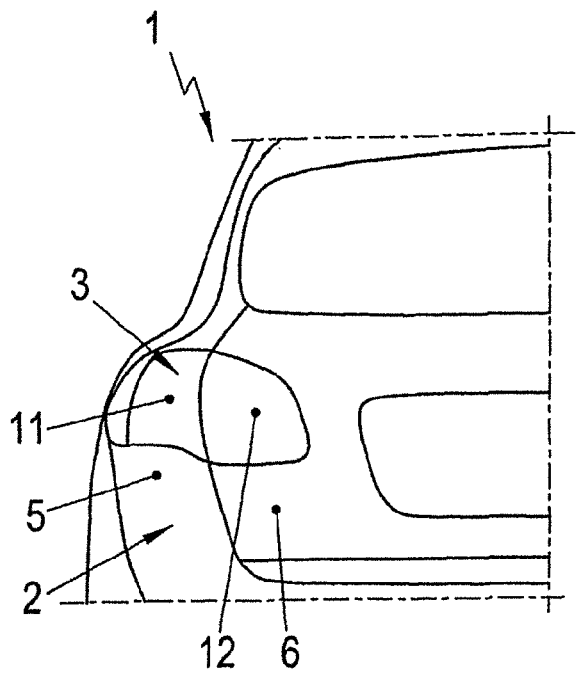
FIG. 1 is a perspective view of a motor vehicle having a left rear light.

FIGS. 1 to 4 show a hatchback motor vehicle 1 having a rear end 2 with a body 5 and a tailgate 6.

A rear light or tail light 3 is integrated into a lateral part of the rear end 2 of the motor vehicle 1. The rear light 3 includes a first rear light body 11 that is fastened to the body 5 in the region of a fender and a second rear light body 12 that is fastened to the tailgate 6 of the motor vehicle 1.

Figure 2:
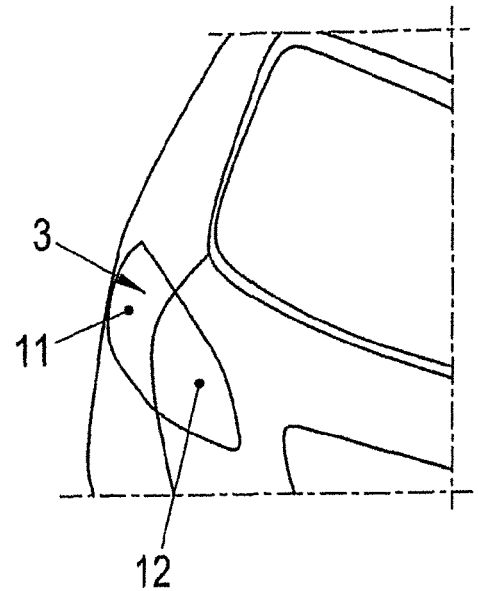
FIG. 2 is the motor vehicle of FIG. 1 from another perspective.

The first rear light body 11 of the rear light 3 is configured to be movable to produce an airflow breakaway edge 15 that can be extended. In FIGS. 1 and 2, the rear light 3 is not activated, and hence there is no airflow breakaway edge in the region of the rear light 3.

Figure 3:
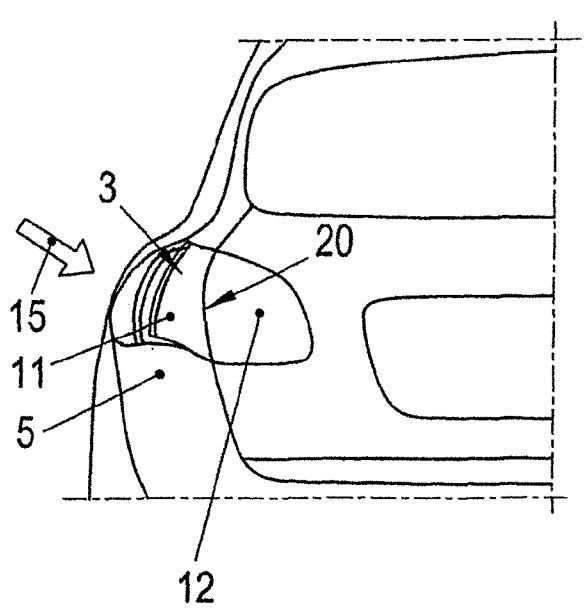
FIGS. 3 and 4 are perspective views similar to FIGS. 1 and 2 respectively, but showing the rear light moved to produce an airflow breakaway edge.
Figure 4:
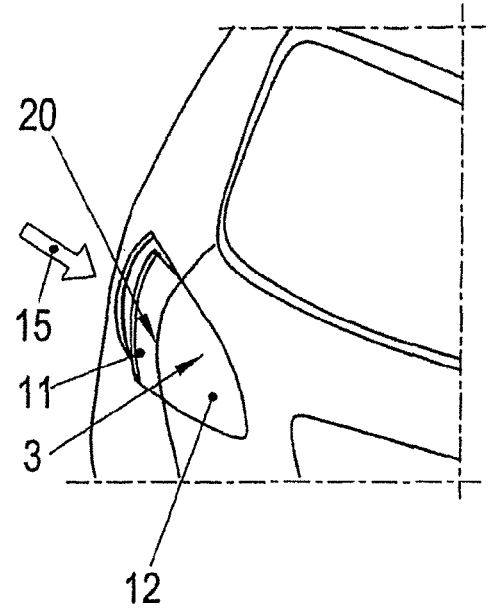

In FIGS. 3 and 4, the first rear light body 11 of the rear light 3 is pivoted or displaced so that an airflow breakaway edge 15 is activated. The airflow breakaway edge 15 is formed on the body 5 of the motor vehicle 1 and is exposed by the first rear light body 11 upon an activation of the rear light 3.

The airflow breakaway edge 15 is arranged laterally on the outside of the first rear light body 11 and runs laterally on the outside substantially in a vertical or Z-direction.

A pivot axis or revolving edge 20 is arranged between the two rear light bodies 11 and 12. The pivot axis or revolving edge 20 can also serve to produce a further airflow breakaway edge.

What is claimed is:

1. A vehicle, comprising: a body, a rear end and at least one rear light attached at a lateral position at the rear end of the vehicle, the rear light being selectively movable relative to all other external parts of the vehicle between a passive position where edges of the rear light are substantially flush with the body and an active position in which at least one airflow breakaway edge is defined by the rear light, the rear light being visible from positions rearward of the rear end of the vehicle in both the passive position and the active position.

2. The vehicle of claim 1, wherein the airflow breakaway edge is arranged laterally on an outside of the rear light.

3. The vehicle of claim 2, wherein the rear light is pivotable between the passive position and the active positions.

4. The vehicle of claim 3, wherein the rear light is pivotable about a substantially vertical pivot axis.

5. The vehicle of claim 4, wherein the pivot axis for the rear light is at laterally inward side of the rear light.

6. The vehicle of claim 4, wherein at least one airflow breakaway edge comprises two airflow breakaway edges disposed respectively at laterally inward sides and laterally outward sides of the rear light.

7. The vehicle of claim 4, wherein the airflow breakaway edges are symmetrical in relation to a vehicle center axis.

8. The vehicle of claim 1, wherein the rear light comprises a first rear light body attached to the body of the vehicle and a second rear light body at a laterally inward position relative to the first rear light body, the airflow breakaway edge being defined by the first rear light body.

9. The vehicle of claim 8, wherein the rear end includes a tailgate, the second rear light body being mounted on the tailgate.

10. A rear light for the vehicle of claim 1.

11. A hatchback vehicle, comprising: a body, a rear end having left and right lateral sides, a tailgate at the rear end inward from the left and right lateral sides and being movable relative to the body and left and right rear lights attached at left and right lateral positions at the rear end of the vehicle, each of the left and right rear lights comprising a first rear light body attached to the body of the vehicle laterally of the tailgate and a second rear light body attached to the tailgate at a position adjacent to the first rear light body, the first rear light body being selectively movable relative to all other external parts of the vehicle between a passive position where edges of the first rear light body are substantially flush with the body of the vehicle and an active position in which at least one airflow breakaway edge is defined by at least one of the edges of the first rear light body, the rear lights being visible from positions rearward of the rear end of the vehicle in both the active position and the passive position.

12. The vehicle of claim 11, wherein the airflow breakaway edge is at a side of the first rear light body remote from the second rear light body.

13. The vehicle of claim 12, wherein the first rear light body is pivotable between the passive position and the active positions.

14. The vehicle of claim 13, wherein the first rear light body is pivotable about a substantially vertical pivot axis.

15. The vehicle of claim 14, wherein the pivot axis is at a side of the first rear light body in proximity to the tailgate.

* * * * *